(12) United States Patent
Chamberlain et al.

(10) Patent No.: US 10,365,963 B2
(45) Date of Patent: Jul. 30, 2019

(54) ACCESSING DAMAGED HEAPS USING COMBINED LINEAR HEAP SLOT BASED AND OBJECT GRAPH WALKING

(71) Applicant: International Business Machines Corporation, Armonk, NY (US)

(72) Inventors: Richard N. Chamberlain, Southampton (GB); Howard J. Hellyer, Hampshire (GB); Adam J. Pilkington, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/407,040

(22) Filed: Jan. 16, 2017

(65) Prior Publication Data

US 2018/0203753 A1 Jul. 19, 2018

(51) Int. Cl.
*G06F 11/07* (2006.01)

(52) U.S. Cl.
CPC .......... *G06F 11/079* (2013.01); *G06F 11/073* (2013.01); *G06F 11/0778* (2013.01); *G06F 2201/86* (2013.01)

(58) Field of Classification Search
CPC ............... G06F 11/079; G06F 11/0778; G06F 11/0751; G06F 11/073; G06F 11/0715; G06F 11/0709
See application file for complete search history.

(56) References Cited

U.S. PATENT DOCUMENTS

| | | | |
|---|---|---|---|
| 6,598,141 B1* | 7/2003 | Dussud | G06F 12/0253 707/999.102 |
| 7,111,141 B2* | 9/2006 | Nelson | A63F 13/12 463/24 |
| 7,249,235 B2 | 7/2007 | Sexton et al. | |
| 7,272,698 B2 | 9/2007 | Bayt | |
| 7,433,862 B1* | 10/2008 | Dussud | G06F 12/0253 |
| 7,770,153 B2 | 8/2010 | Chilimbi et al. | |
| 7,904,687 B2* | 3/2011 | Nelson | A63F 13/12 463/24 |

(Continued)

OTHER PUBLICATIONS

IBM Knowledge Center, "Locating and analyzing heap dumps Version 8.0", retrieved Aug. 3, 2016, <https://www.ibm.com/support/knowledgecenter/en/SSAW57_8.0.0/com.ibm.websphere.nd.doc/info/ae/ae/tprf_collectingheapdumps.html> 1 page.

(Continued)

*Primary Examiner* — Nadeem Iqbal
(74) *Attorney, Agent, or Firm* — Patterson + Sheridan, LLP

(57) ABSTRACT

Embodiments described herein provide a method, system, and computer readable medium configured to analyze a heap following a core dump is disclosed herein. The method begins by generating the core dump responsive to an occurrence of an event in a run-time environment. The core dump contains the contents of a heap at a moment in time that the event occurred. The processor analyzes the heap in the run-time environment using a first heap analysis method at a first starting point in the heap. The heap includes one or more slots. Each slot contains one or more objects. The processor analyzes the contents of the heap specified by the core dump using a second heap analysis method at a second starting point in the heap, responsive to determining that a first slot is not reachable.

15 Claims, 6 Drawing Sheets

(56) References Cited

U.S. PATENT DOCUMENTS

| | | |
|---|---|---|
| 8,799,716 B2 | 8/2014 | Jalaldeen et al. |
| 9,251,339 B2 * | 2/2016 | Bullis .................... G06F 21/50 |
| 2011/0161956 A1 | 6/2011 | Vennam et al. |
| 2015/0227414 A1 | 8/2015 | Varma |

OTHER PUBLICATIONS

Mechanical Sympathy, "Memory Access Patterns Are Important", retrieved Aug. 3, 2016, <http://mechanical-sympathy.blogspot.in/2012/08/memory-access-patterns-are-important.html>, article dated Aug. 5, 2012, 16 pages.

* cited by examiner

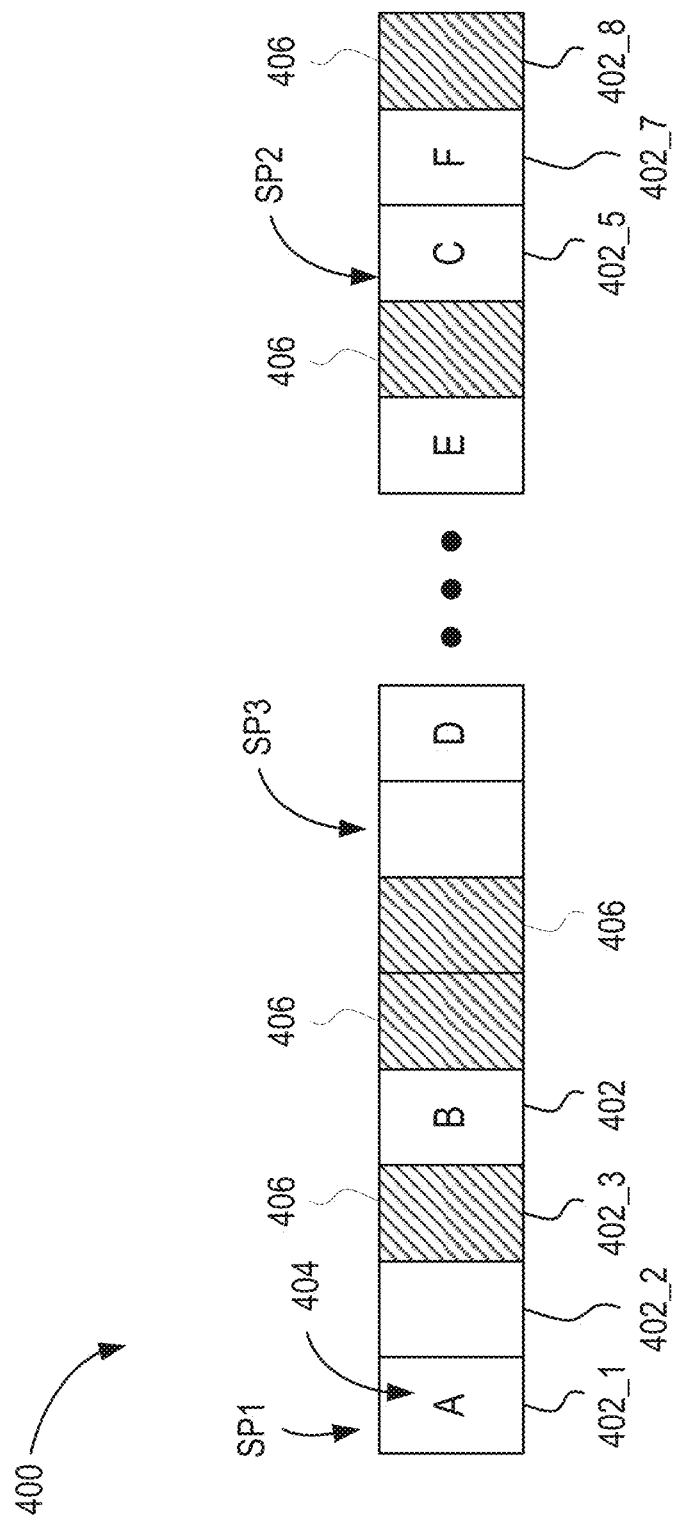

ACCESSING DAMAGED HEAPS USING COMBINED LINEAR HEAP SLOT BASED AND OBJECT GRAPH WALKING

BACKGROUND

The present disclosure generally relates to heap analysis, and more specifically to, heap analysis in a run-time environment.

During a course of operation, a processing system may experience various failures that are caused by problems in software and/or hardware components. When an application crashes or is terminated abnormally, the operating system may initiate a core dump. The core dump consists of the recorded state of the working memory of the application at a specific time. Core dumps are often useful to assisting in diagnosing and debugging errors in computer programs. The core dump represents the complete contents of the dumped regions of the address space of the dumped process. Often, the damage that caused the program failure overwrote sections of memory. For run-time environments most of the process memory will be the heap memory, which therefore is a likely area of damage. Accessing a greater amount of data in the heap portion of the core dump improves diagnosis of the issue that caused the crash or early termination.

When examining data contained in the heap, the heap is "walked" to find all objects contained in the heap. In one embodiment, this may be done linearly by reading memory allocated to the heap from its start address, and walking each object slot or free slot in the heap. The linear heap walk can determine the size of each slot either because they are a fixed size or by looking at the type of object in the slot to obtain size information. However, as the core dump is initiated by program failure, or damage, the linear heap walks fails once it encounters the damage within the heap. As such, the linear heap walk is unable to continue past the damaged portions of the heap. This prevents the examination process from accessing the entirety of the heap, resulting in an incomplete diagnosis of the issue that caused the crash or early termination.

SUMMARY

Embodiments described herein provide a method, system, and computer readable medium configured to analyze a heap following a core dump is disclosed herein. The method begins by generating the core dump responsive to an occurrence of an event in a run-time environment. The core dump contains the contents of a heap at a moment in time that the event occurred. The processor analyzes the heap in the run-time environment using a first heap analysis method at a first starting point in the heap. The heap includes one or more slots. Each slot contains one or more objects. The processor analyzes the contents of the heap specified by the core dump using a second heap analysis method at a second starting point in the heap, responsive to determining that a first slot is not reachable.

BRIEF DESCRIPTION OF THE SEVERAL VIEWS OF THE DRAWINGS

FIG. 4A illustrates the heap in the form of slots based on relative location of objects in heap memory, according to one embodiment described herein.

DETAILED DESCRIPTION

Figure 1:
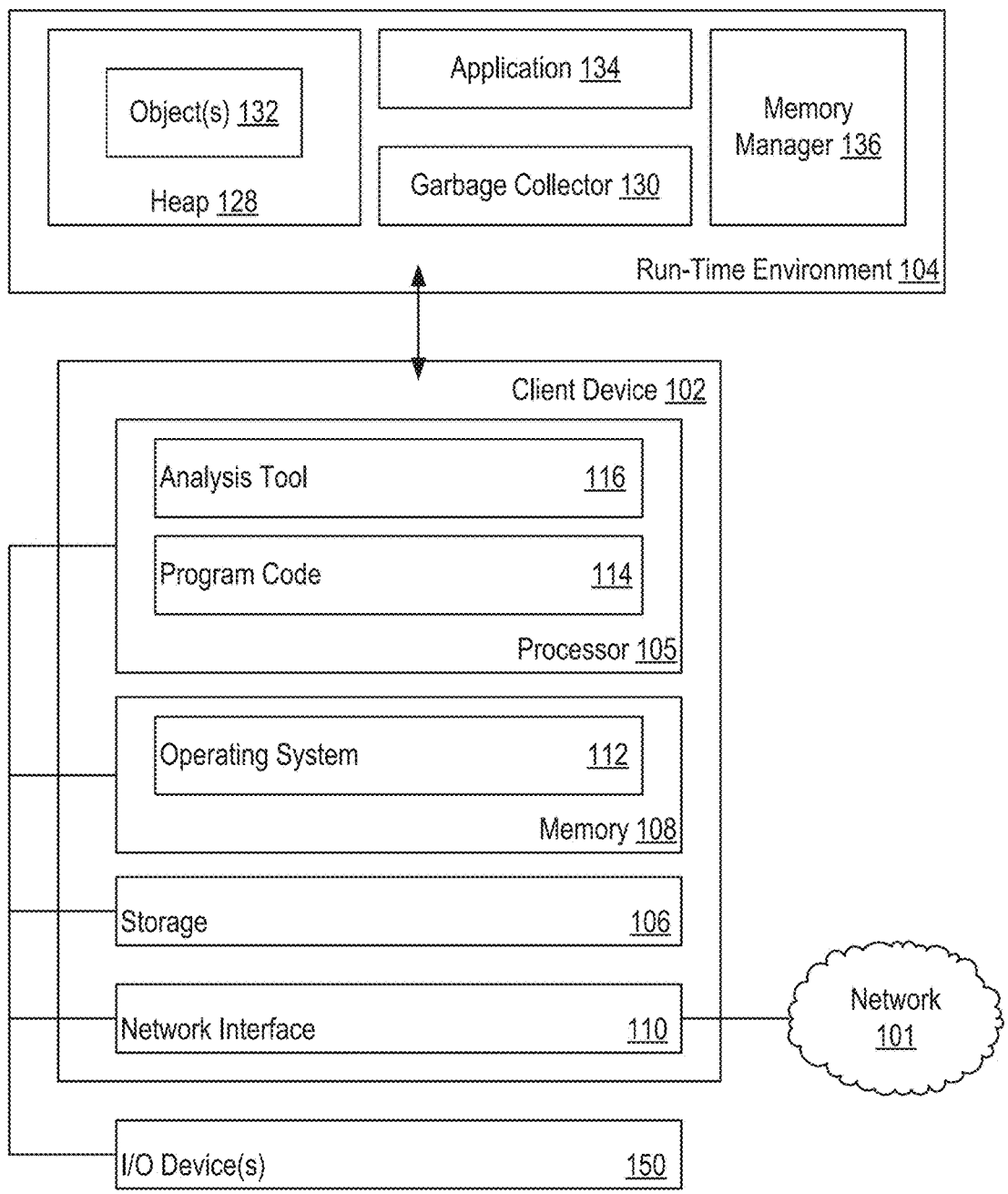
FIG. 1 illustrates a computing environment, according to one embodiment described herein.

FIG. 1 illustrates a computing environment 100 according to one embodiment. The computing environment 100 includes client device 102 and a run-time environment 104 launched by client device 102. The client device 102 includes a processor 105, storage media 106, memory 108, and network interface 110. The client system 102 may connect to the network 101 using the network interface 110. The client system 102 may be in communication with one or more I/O device(s) 150. Furthermore, as will be understood by one of ordinary skill in the art, any computer capable of performing the functions described herein may be used.

In the pictured embodiment, memory 108 contains an operating system 112. Although memory 108 is shown as a single entity, memory 108 may include one or more memory devices having blocks of memory associated with physical addresses, such as random access memory (RAM), read only memory (ROM), flash memory, or other types of volatile and/or non-volatile memory.

Computer processor 105 may be any processor capable of performing the functions described herein. The processor 105 contains an analysis tool 116 having program code 114. Analysis tool 116 is configured to carry out the method in program code 114. The program code 114 is generally capable of carrying out the method discussed below in conjunction with FIGS. 2-3. For example, the program code 114 is capable of carrying out a method of accessing damaged heaps using a combined linear heap slot approach and an object graph approach.

The run-time environment 104 supports execution of one or more applications (e.g., application 134) that provide, for example, web services, database services, and other information technology services that may involve retrieval, processing, and serving data to one or more users. In one particular embodiment, the run-time environment 104 is a Java Runtime Environment, although it should be noted that other memory-managed environments may be utilized with embodiments of the present disclosure. In the present embodiment, the run-time environment 104 represents, for example, a paused, crashed, or dumped computer process that will be examined using the analysis tool 116. Memory used by and during execution of application 134 is handled by memory manager 136. Memory manager 136 may allocate memory from a portion of virtual memory specifically reserved for run-time environment 104, referred to as heap memory. The run-time environment 104 includes a heap 128 and a garbage collector 130 to manage one or more objects 132 allocated for the application 134 executing within the run-time environment 104. Garbage collector 130 is a memory manager for run-time environment 104 that attempts to reclaim heap memory occupied by objects in heap 128 that are no longer used by the run-time environment 104. Heap 128 includes a region of memory (referred to herein as "heap memory") reserved for storing one or more data objects (e.g., Java objects) and other data structures utilized during execution of the application 134. When the heap 128 runs out of space or fails to meet a threshold level of memory availability, the garbage collector 130 may initiate a garbage collection process wherein "live" objects are compacted and "dead" objects are cleared to create free space within the heap 128.

When an application, such as application 134, crashes or is terminated abnormally, the client device 102 may initiate a core dump. The core dump consists of the recorded state of the working memory of the application at a specific time. For example, the core dump may consist of a recorded state of the heap memory of application 134. Core dumps are often useful to assisting in diagnosing and debugging errors in computer programs. The core dump represents the complete contents of the dumped regions of the address space of the dumped process. Often, the event (e.g., crash, abnormal termination, etc.) that caused the program failure also overwrote sections of memory. This makes much of the data unavailable to diagnostic tools, such as analysis tool 116. For run-time environments, such as run-time environment 104, most of the process memory will be the heap memory, which therefore is a likely area of damage. Accessing a greater amount of data in the heap portion of the core dump improves diagnosis of the issue that caused the crash or early termination.

When examining data contained in the heap 128, the heap 128 is "walked" to find all objects contained in the heap 128. In one embodiment, this may be done linearly by starting at a start address of the heap 128 and walking each object slot or free slot in the heap 128. The linear heap walk can determine the size of each slot either because they are a fixed size or by looking at the type of object in the slot to obtain size information. However, as the core dump is initiated by program failure, or damage, the linear heap walks fails once it encounters the damage within the heap 128. As such, the linear heap walk is unable to continue past the damage portions of the heap 128. This prevents the analysis tool from accessing the entirety of the heap, resulting in an incomplete diagnosis of the issue that caused the crash or early termination.

In another embodiment, the heap walk may be done through a graph based walk. The graph based heap walks follows a network of references from one object to another, starting with a set of known roots. The analysis tool keeps tracks of objects already visited (e.g., using a mark map) to avoid reference cycles. A heap root is a reference to an object within the heap contained in some data structure stored outside the managed run-time heap (e.g., in a stack frame). However, as the core dump is initiated by program failure or damage, the graph based heap walk fails once it encounters the damage within the heap 128. As such, the graph based heap walk is unable to follow the network of references past the damaged portions of the heap 128. This prevents the analysis tool from accessing the entirety of the heap, resulting in an incomplete diagnosis of the issue that caused the crash or early termination.

Figure 2:
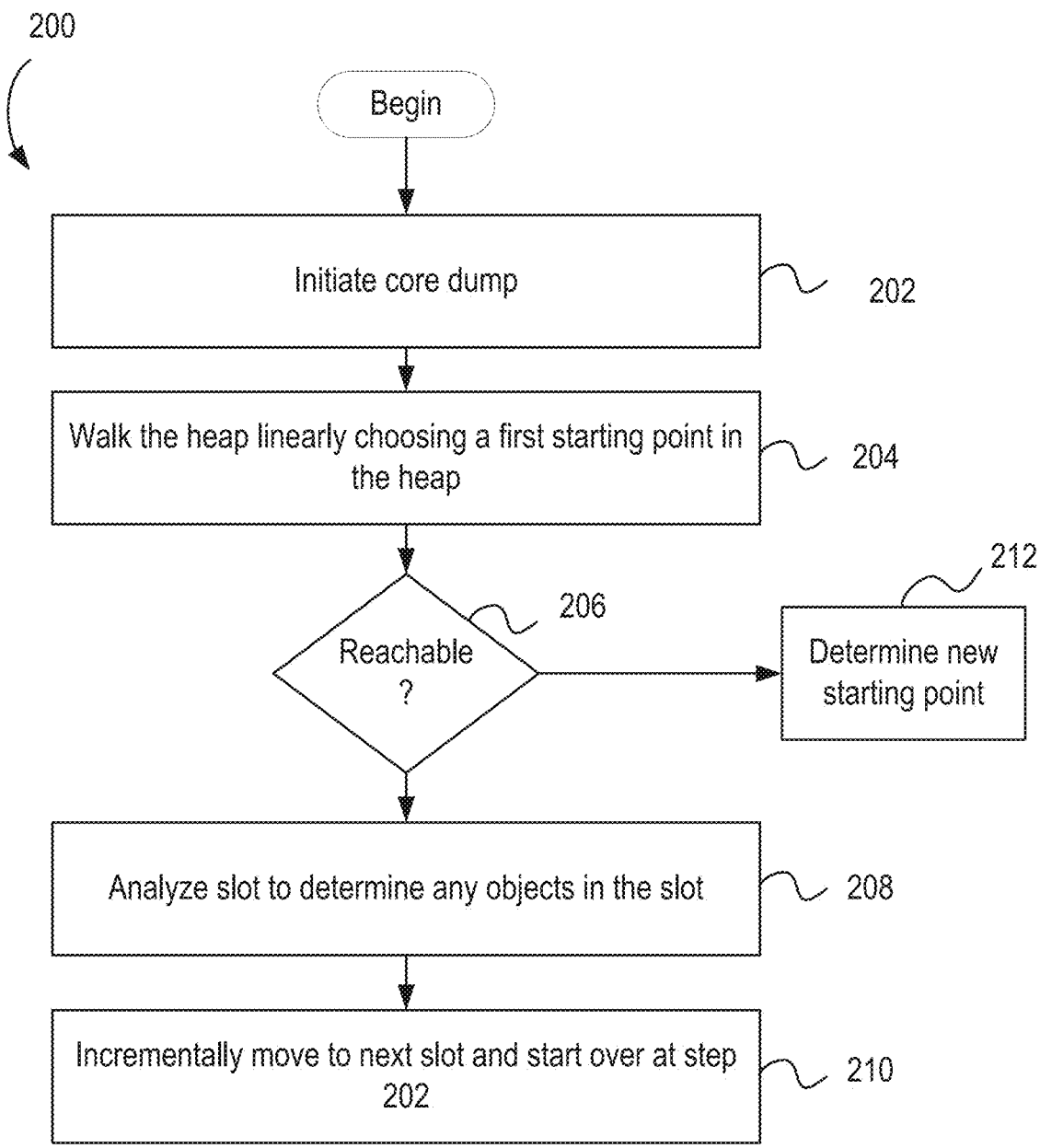
FIG. 2 is a flow diagram illustrating a method of analyzing a heap following a core dump, according to one embodiment described herein.

The analysis tool 116 implements program code 114 that is configured to carry out a method of heap walking using a combination method configured to provide a user with a more complete diagnosis of the issue that caused the crash or early termination by analyzing the heap 128 past the point of damage. FIG. 2 is a flow diagram illustrating a method 200 of analyzing a heap 128 following a core dump, according to one embodiment.

At step 202, the operating system initiates a core dump responsive to detecting program failure. For example, the operating system may initiate a core dump responsive to application 134 crashing or abnormally terminating. The analysis tool 116 begins walking the heap 128 linearly by choosing a first starting point in the heap 128 (step 204). For example, the analysis tool 116 may choose as the first starting point the first slot. In another example, the analysis tool 116 may choose as the first starting point slot n, where n represents any numbered slot within the heap. The analysis tool 116 walks the heap incrementally, one slot at a time. For example, starting at slot n, analysis tool walks to heap incrementally to slot n+1.

The analysis tool 116 accesses the data contained in each slot in the heap 128. For each slot, the analysis tool 116 determines whether the slot is reachable, i.e. whether the slot is included in the damaged portion of the heap 128 or contains a damaged object (step 206). If the analysis tool 116 determines that the slot is reachable, the analysis tool 116 analyzes the slot to determine any objects in the slot (step 208). The analysis tool 116 then moves incrementally to the next slot (n+1) and repeats the process (step 210). If, however, the analysis tool 116 determines that the slot is not reachable, the analysis tool 116 determines a new starting point (step 212). The new starting point is determined by accessing the heap as a graph (or network) or objects rather than as the linear representation of objects, which is discussed in more detail in conjunction with FIG. 3 below. The new starting point allows the analysis tool 116 to extend past the damaged heap section such that slots that were previously unreachable are now reachable, thus providing a more complete diagnostic of the event that triggered the core dump. Once the new starting point is determined, the method 200 reverts to step 204, and begins the heap walk from the new starting point.

Figure 3:
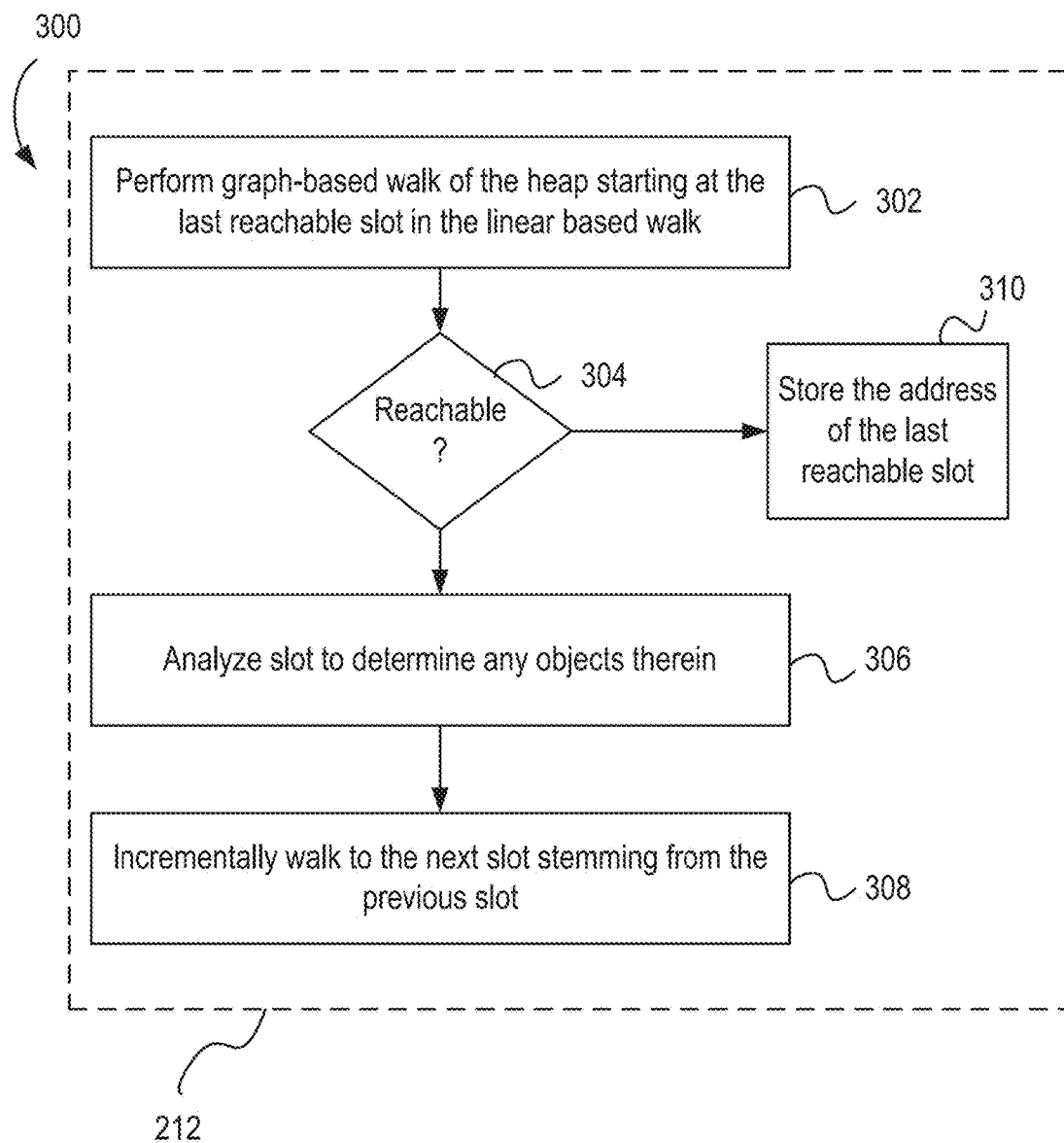
FIG. 3 is a flow diagram illustrating a method of determining a new starting point, according to one embodiment described herein.

FIG. 3 is a flow diagram illustrating a method 300 of determining a new starting point (step 212 form FIG. 2), according to one embodiment. As recited above, method 300 is launched responsive to determining that the current slot analyzed by the analysis tool 116 is not reachable by the analysis tool 116. The analysis tool 116 begins a graph based walk of the heap 128 (step 302). The analysis tool 116 begins the graph based walk using the off-heap root set. The root set is augmented with objects that were already reached through the linear walk in method 200. Any object that has already been reached and marked by the graph walk is not included as a root, i.e. is not traversed further.

The analysis tool 116 accesses the data contained in each slot in the heap 128 using the graph based walk. For each slot, the analysis tool 116 determines whether the slot is reachable (step 304). If the analysis tool 116 determines that the slot is reachable, the analysis tool 116 analyzes the slot to determine any objects in the slot (step 306). The analysis tool 116 then moves incrementally to the next slot stemming from the previous slot (step 308). If, however, the analysis tool 116 determines that the slot is not reachable, the analysis tool 116 stores the address of the last reachable slot (step 310). The linear walk (method 200) is then restarted at the nearest object after the damage point, i.e. the object at the lowest address that is past the address of the last current object in the graph walk. The last reachable slot is then used as the new starting point for method 200. By following the "roots" of the graph based walk outside of the linear walk, the analysis tool is able to obtain a range of starting locations for the linear based walk. From these starting locations, the analysis tool 116 can continue to walk forwards linearly across each object slot in the heap and also follow the references from those objects to other objects within the heap. Assuming the heap is damaged, the linear walk will encounter bad data; however, from the range of starting locations, it is possible to find upper and lower bounds for the damaged ranges of the heap, thus allowing an estimate of the size of the damage, as well as allowing the analysis tool 116 to retrieve more information from the heap dump, resulting in a better analysis of the issue causing the core dump. For example, establishing that the heap damage is at least 4 kB in size, but not much larger, an experienced service engineer may start to follow leads to establish which parts of the program are using 4 kB buffers for data and may have written to a bad address. By retrieving more objects from the heap, the service engineer may be able to find an object containing the first damaged address, thus allowing them to see which part of the program had caused the damage. This increases the amount of information that can be gathered, thus increasing the chances of being able to find the cause.

Figure 4B:
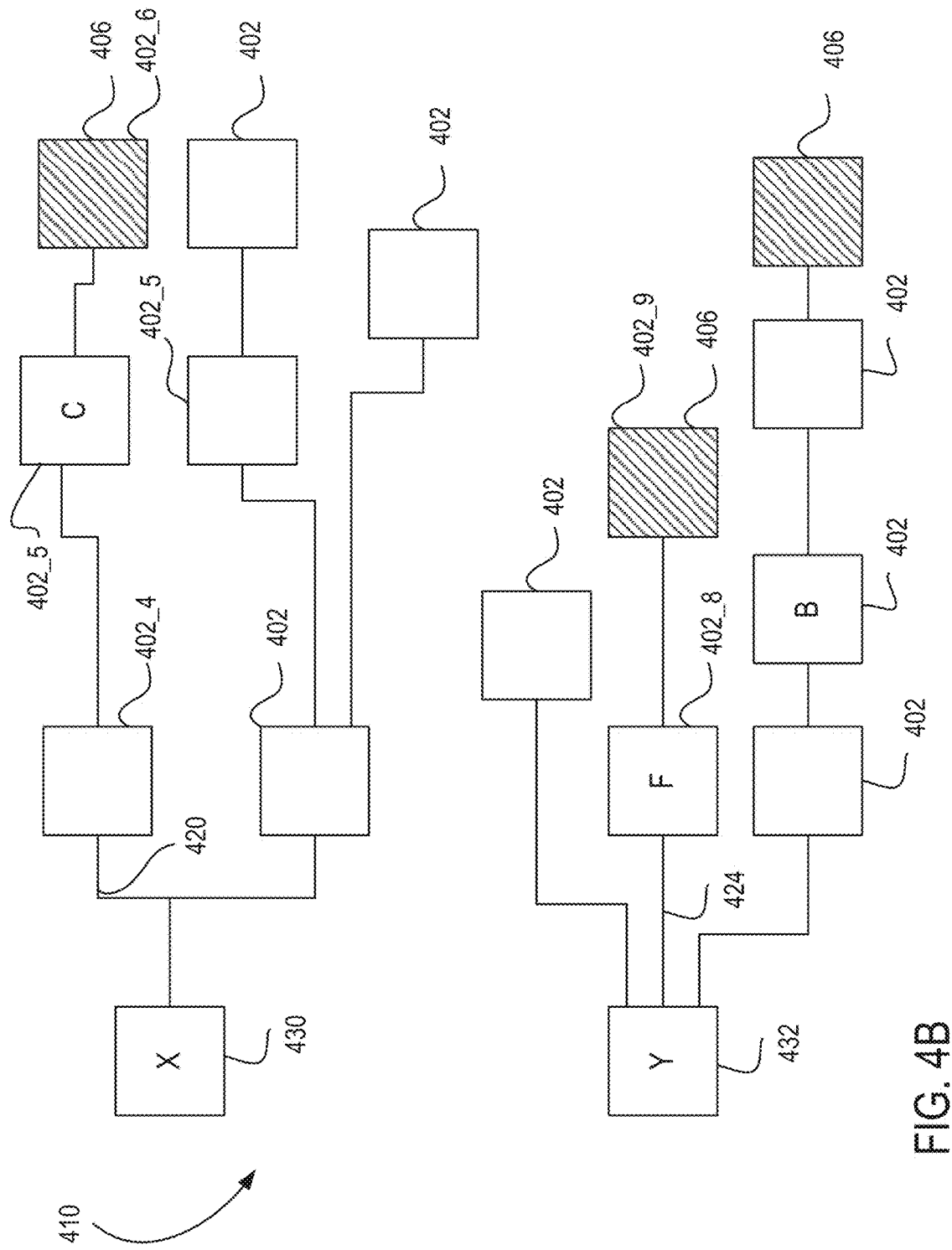
FIG. 4B illustrates the heap in the form of a graph based on roots of the objects in heap memory, according to one embodiment described herein.

FIG. 4A illustrates the heap 128 in the form of slots based on relative location of objects in heap memory, which will be referred to as a linear heap 400. FIG. 4B illustrates the heap 128 in the form of a graph based on roots of the objects in heap memory, which will be referred to as a graph-based heap 410. The linear heap 400 and the graph-based heap 410 include a plurality of slots 402. Each slot 402 includes one or more objects 404. For example, the one or more objects 404 illustrated are Objects A-F. The linear heap 400 and the graph-based heap 410 include one or more areas of damage 406. As recited, the one or more damaged areas create issues for conventional heap walking techniques.

Figure 5A:
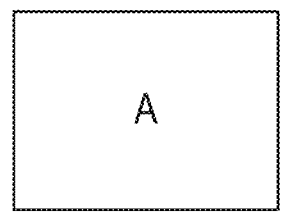
FIGS. 5A-5B illustrate the objects captured by the analysis tool carrying out method 200 on the heap as depicted in FIGS. 4A-4B, according to one embodiment described herein.
Figure 5B:
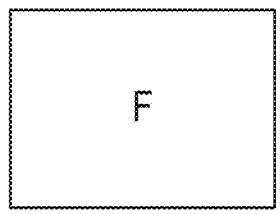
Figure 5B:
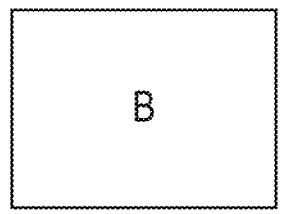
Figure 5B:
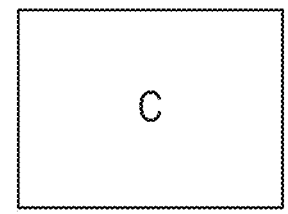

FIGS. 5A-5B illustrate the objects captured by the analysis tool 116 carrying out method 200 on heap 128 as depicted in FIGS. 4A-4B, according to one embodiment. The operating system initiates a core dump responsive to detecting program failure. The analysis tool accesses the heap 128 using the analysis tool 116 to diagnose the issue that caused program failure. The analysis tool 116 begins diagnosing the issue by setting a first starting point, SP1, for a linear walk of the heap 128. As illustrated in FIG. 4A, the first starting point SP1 is the first slot 402 in the linear heap 400. In other examples, the first starting point SP1 may be any other slot in the linear heap 400. Starting at the first starting point SP1, the analysis tool incrementally analyzes each slot 402 to determine the one or more objects 404 contained in the slot 402. As illustrated, slot 402_1 contains object A. Analysis tool 116 notes that object A is contained in slot 402_1. The analysis tool 116 then moves incrementally to the next slot, slot 402_2. The analysis tool 116 determines whether slot 402_2 is reachable. If slot 402_2 is reachable, the analysis tool 116 analyzes slot 402_2 for any objects contained therein. As illustrated, slot 402_2 is reachable as it does not include a damaged object and it is not contained in the damaged area 406. Therefore, the analysis tool 116 analyzes slot 402_2. Because there is no object contained in slot 402_2, there is nothing for analysis tool 116 to note. The analysis tool 116 then moves incrementally to the next slot, slot 402_3. The analysis tool 116 determines whether slot 402_3 is reachable. Because slot 402_3 is contained in the damaged area 406 of the heap 128, the analysis tool 116 must determine a new starting point, SP2.

As discussed in conjunction with FIG. 3, to determine the new starting point SP2, the analysis tool 116 analyzes the heap 128 in the graph-based form 410. In one embodiment, the analysis tool 116 begins the graph-based walk at the slot that was the last reachable slot during the linear heap walk. In this example, the starting point for the graph-based walk is slot 402_2. In another embodiment, the analysis tool 116 begins the graph-based walk using all the roots in the graph-based form 410 of the heap 128. The analysis tool 116 locates the off-heap root set 430 and 432. The analysis tool 116 begins the graph-based walk from root set 430. The analysis tool 116 walks incrementally along the one or more roots stemming from slot 430. For example, the analysis tool 116 first walks incrementally along a first root 420 stemming from slot 430 to slot 402_4. The analysis tool 116 determines whether slot 402_4 is reachable. If slot 402_4 is reachable, the analysis tool 116 analyzes slot 402_4 for any objects contained therein. As illustrated, slot 402_4 is reachable and does not include any objects. The analysis tool then continues to walk incrementally along root 420. The analysis tool determines whether slot 402_5 is reachable. If slot 402_5 is reachable, the analysis tool 116 analyzes slot 402_5 for any objects contained therein. As illustrated, slot 402_5 is reachable and contains object C. Analysis tool 116 notes that object C is contained in slot 402_5. The analysis tool 116 then continues to walk incrementally along root 422 from slot 402_5 to slot 402_6. The analysis tool 116 determines whether slot 402_6 is reachable. If slot 402_6 is not reachable, the analysis tool 116 notes the highest reachable address in the graph-based walk. As illustrated, slot 402_6 is not reachable as it is contained in the damaged area 406. Accordingly, the analysis tool 116 notes that the highest address reached in the graph-based walk is slot 402_5. Slot 402_5 will be used as the new starting point, SP2, in a second linear walk of the heap 128.

FIG. 5B illustrates the objects collected after a second linear walk and graph-based walk of the heap 128. The second linear walk of the heap 128 begins at starting point SP2. The analysis tool 116 locates slot 402_5 in the linear heap 400. The analysis tool 116 then moves incrementally along the linear heap 400 from slot 402_5 to slot 402_7. The analysis tool determines whether slot 402_7 is reachable. If slot 402_7 is reachable, the analysis tool 116 analyzes slot 402_7 for any objects contained therein. As illustrated, slot 402_7 is reachable and contains Object F. The analysis tool then moves incrementally from slot 402_7 to slot 402_8. The analysis tool 116 determines whether slot 402_8 is reachable. If slot 402_8 is not reachable, the analysis tool 116 notes that last reachable slot and determines a new starting point SP3. Because slot 402_8 is contained in the damaged area 406, slot 402_8 is not reachable. Therefore, a new starting point must be determined.

As discussed in conjunction with FIG. 3, to determine the new starting point SP3, the analysis tool 116 analyzes the heap 128 in the graph-based form 410. The analysis tool 116 begins the graph-based walk at the slot that was the last reachable slot during the linear heap walk or at the off-root heap sets 430, 432. In this example, the starting point for the graph-based walk is off-root heap set 432. The analysis tool 116 locates slot 402_7 in the graph-based 410 representation of the heap 128. The analysis tool 116 begins the graph-based walk from slot 432. The analysis tool 116 walks incrementally a root 424 stemming from slot 432 to slot 402_8. The analysis tool 116 determines whether slot 402_8 is reachable. If slot 402_8 is reachable, the analysis tool 116 analyzes slot 402_8 for any objects contained therein. As illustrated slot 402_8 contains object F. Analysis tool 116 notes that slot 402_8 contains objet F. The analysis tool 116 then incrementally walks from slot 402_8 to slot 402_9 along root 424. The analysis tool 116 determines whether slot 402_9 is reachable. If slot 402_9 is not reachable, the analysis tool 116 notes the highest reachable address in the graph-based walk. As illustrated, slot 402_9 is not reachable as it is contained in the damaged area 406. Accordingly, the analysis tool 116 notes that the highest address reached in the graph-based walk is slot 402_8. Slot 402_8 will be used as the new starting point, SP3, in a second linear walk of the heap 128.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A method, comprising:
    generating a core dump responsive to an occurrence of an event in a run-time environment, wherein the core dump specifies contents of a heap at a moment in time that the event occurred, wherein the heap includes one or more slots, and wherein each slot of the one or more slots contains a respective one or more objects;
    selectively processing the contents of the heap of the core dump, using an analysis application and by operation of one or more computer processors, using one of a plurality of heap analysis methods, comprising:
        analyzing the contents of the heap specified by the core dump using a first heap analysis method of the plurality of heap analysis methods, at a first starting point in the heap, wherein the first heap analysis method comprises analyzing a linear representation of the heap; and
        responsive to determining that a first slot is not reachable using the first heap analysis method:
            determining a second starting point in the heap; and
            analyzing the contents of the heap specified by the core dump using a second heap analysis method, the second starting point in the heap, wherein the second heap analysis method comprises analyzing a graph-based representation of the heap.

2. The method of claim 1, wherein analyzing the heap in the run-time environment using a first heap analysis, comprises:
    locating the first starting point in a linear representation of the heap;
    determining whether the first starting point in the heap is reachable;
    responsive to determining that the first starting point is reachable, incrementally walking to heap to slot n +1, where n represents a last analyzed slot.

3. The method of claim 2, further comprising:
    determining whether the n+1 slot is reachable;
    responsive to determining that the n+1 slot is reachable, analyzing the n+1 slot to determine whether the n+1 slot contains one or more objects; and
    responsive to determining that the n+1 slot contains one or more objects, recording that the n+1 slot contains one or more objects.

4. The method of claim 1, wherein responsive to determining that a first slot is not reachable, analyzing the contents of the heap specified by the core dump using a second heap analysis method at a second starting point in the heap, comprises:
    locating the first starting point in a graph-based depiction of the heap;
    identifying one or more roots stemming from the first starting point;
    incrementally walking along the one or more roots until a second slot is reached;
    determining whether the second slot is reachable; and
    responsive to determining that the second slot is reachable, incrementally walking along the one or more roots until another slot is reached.

5. The method of claim 4, further comprising:
    incrementally walking along the one or more roots until a third slot is reached;
    determining whether the third slot is reachable; and
    responsive to determining that the third slot is reachable, identifying the second slot as a furthest slot reached.

6. A system, comprising
    a computer processor; and
    a memory containing a program that, when executed on the computer processor, performs an operation, comprising:
        generating a core dump responsive to an occurrence of an event in a run-time environment, wherein the core dump specifies contents of a heap at a moment in time that the event occurred, wherein the heap includes one or more slots, and wherein each slot of the one or more slots contains a respective one or more objects;
        selectively processing the contents of the heap of the core dump, using an analysis application and by operation of one or more computer processors, using one of a plurality of heap analysis methods, comprising:
            analyzing the contents of the heap specified by the core dump using a first heap analysis method of the plurality of heap analysis methods, at a first starting point in the heap; and
            responsive to determining that a first slot is not reachable using the first heap analysis method:
                determining a second starting point in the heap; and
                analyzing the contents of the heap specified by the core dump using a second heap, wherein the second heap analysis method comprises analyzing a graph-based representation of the heap analysis method, at the second starting point in the heap.

7. The system of claim 6, wherein analyzing the heap in the run-time environment using a first heap analysis, comprises:
    locating the first starting point in a linear representation of the heap;
    determining whether the first starting point in the heap is reachable;
    responsive to determining that the first starting point is reachable, incrementally walking to heap to slot n +1, where n represents a last analyzed slot.

8. The system of claim 7, wherein the operation further comprises:
    determining whether the n+1 slot is reachable;
    responsive to determining that the n+1 slot is reachable, analyzing the n+1 slot to determine whether the n+1 slot contains one or more objects; and responsive to determining that the n+1 slot contains one or more objects, recording that the n+1 slot contains one or more objects.

9. The system of claim 6, wherein responsive to determining that a first slot is not reachable, analyzing the contents of the heap specified by the core dump using a second heap analysis method at a second starting point in the heap, comprises:
locating the first starting point in a graph-based depiction of the heap;
identifying one or more roots stemming from the first starting point;
incrementally walking along the one or more roots until a second slot is reached;
determining whether the second slot is reachable; and
responsive to determining that the second slot is reachable, incrementally walking along the one or more roots until another slot is reached.

10. The system of claim 9, wherein the operation further comprises:
incrementally walking along the one or more roots until a third slot is reached;
determining whether the third slot is reachable; and
responsive to determining that the third slot is reachable, identifying the second slot as a furthest slot reached.

11. A computer program product for analyzing a heap following a core dump, the computer program product comprising:
a computer-readable storage medium having computer-readable program code embodied therewith, the computer-readable program code executable by one or more computer processors to:
generate a core dump responsive to an occurrence of an event in a run-time environment, wherein the core dump specifies contents of a heap at a moment in time that the event occurred, wherein the heap includes one or more slots, and wherein each slot of the one or more slots contains a respective one or more objects;
selectively process the contents of the heap of the core dump, using an analysis application and by operation of one or more computer processors, using one of a plurality of heap analysis methods, comprising:
analyze the contents of the heap specified by the core dump using a first heap analysis method of the plurality of heap analysis methods, at a first starting point in the heap; and
responsive to determining that a first slot is not reachable using the first heap analysis method:
determine a second starting point in the heap; and
analyze the contents of the heap specified by the core dump using a second heap analysis method at the second starting point in the heap, wherein the second heap analysis method comprises analyzing a graph-based representation of the heap.

12. The computer program product of claim 11, wherein analyzing the heap in the run-time environment using a first heap analysis, comprises:
locating the first starting point in a linear representation of the heap;
determining whether the first starting point in the heap is reachable;
responsive to determining that the first starting point is reachable, incrementally walking to heap to slot n +1, where n represents a last analyzed slot.

13. The computer program product of claim 12, wherein the computer-readable program code is further executable by one or more computer processors to:
determine whether the n+1 slot is reachable;
responsive to determining that the n+1 slot is reachable, analyze the n+1 slot to determine whether the n+1 slot contains one or more objects; and
responsive to determining that the n+1 slot contains one or more objects, record that the n+1 slot contains one or more objects.

14. The computer program product of claim 11, wherein analyze the contents of the heap specified by the core dump using a second heap analysis method at a second starting point in the heap, responsive to determining that a first slot is not reachable, comprises:
locating the first starting point in a graph-based depiction of the heap;
identifying one or more roots stemming from the first starting point;
incrementally walking along the one or more roots until a second slot is reached;
determining whether the second slot is reachable; and
responsive to determining that the second slot is reachable, incrementally walking along the one or more roots until another slot is reached.

15. The computer program product of claim 14, wherein the computer-readable program code is further executable by one or more computer processors to:
incrementally walk along the one or more roots until a third slot is reached;
determine whether the third slot is reachable; and
responsive to determining that the third slot is reachable, identify the second slot as a furthest slot reached.

* * * * *